United States Patent [19]

Baker

[11] 4,105,304
[45] Aug. 8, 1978

[54] SIDE GLARE-ELIMINATING DEVICE FOR SECUREMENT TO EYEGLASSES AND OTHER SUITABLE MOUNTING STRUCTURES

[76] Inventor: Alfred Baker, 153 E. Central Ave., Pearl River, N.Y. 10965

[21] Appl. No.: 739,437

[22] Filed: Nov. 8, 1976

[51] Int. Cl.$^2$ ............................................. G02C 9/04
[52] U.S. Cl. ........................................ 351/47; 351/49
[58] Field of Search ..................... 351/47, 49, 111, 44; 2/13, 432

[56] References Cited

U.S. PATENT DOCUMENTS

| | | | |
|---|---|---|---|
| 2,251,330 | 8/1941 | Fairbank | 351/49 |
| 3,204,252 | 9/1965 | Herrington, Sr. | 351/111 X |
| 3,266,111 | 8/1966 | Abel | 351/111 X |
| 3,838,913 | 10/1974 | Schwarz | 351/49 X |
| 3,876,295 | 4/1975 | Loughner | 351/48 X |

*Primary Examiner*—Paul A. Sacher
*Attorney, Agent, or Firm*—Philip D. Amins

[57] ABSTRACT

A side glare device for attachment to a temple-bar of eyeglass frames and similar mounting structures, having a first glare shield member and a second glare shield member with overlapping surfaces for adjustment relative to each other along a common plane to vary the amount of light, and in particular sunlight, transmitted to the eyes of the wearer of the eyeglass frames from a lateral peripheral direction, means for coupling of the first and second members with respect to one another to permit relative positionment of the second member with respect to the first member along the common plane is provided. Means for permitting removable adjustable positional securement of the first member on the temple-bar for maintaining the device at the desired position upon the temple-bar, and means for positionally adjusting the angular orientation of the device with respect to said temple-bar from a raised elevation to a lowered elevation, is also provided.

37 Claims, 6 Drawing Figures

U.S. Patent  Aug. 8, 1978  4,105,304
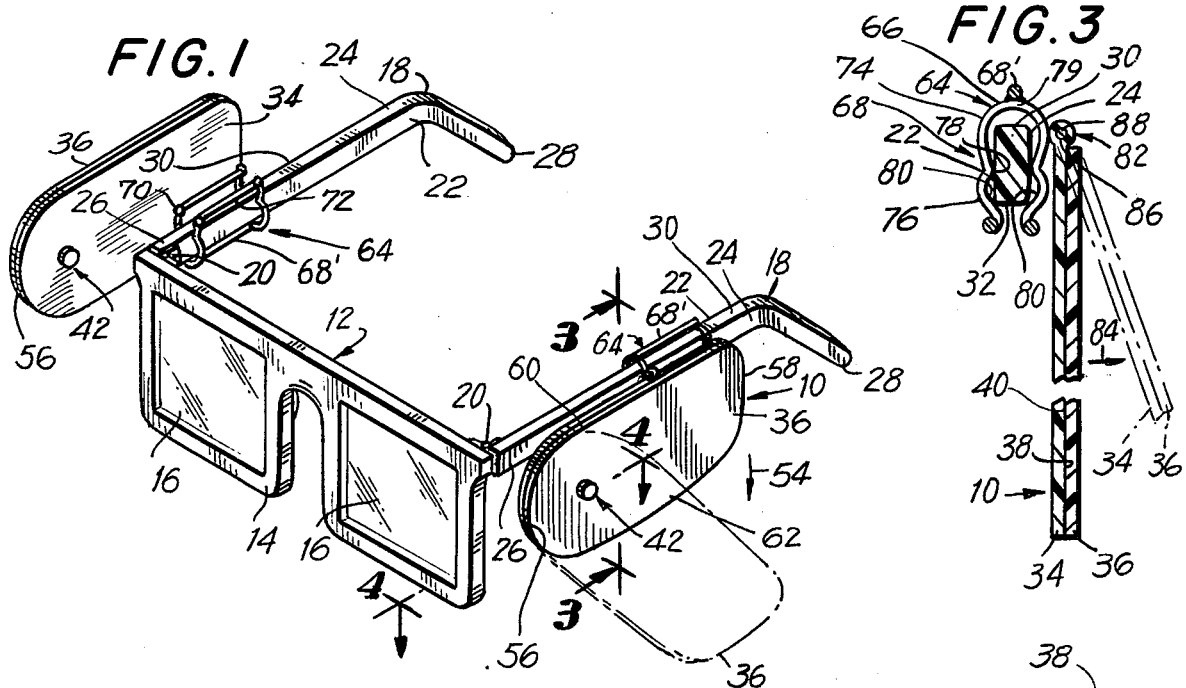
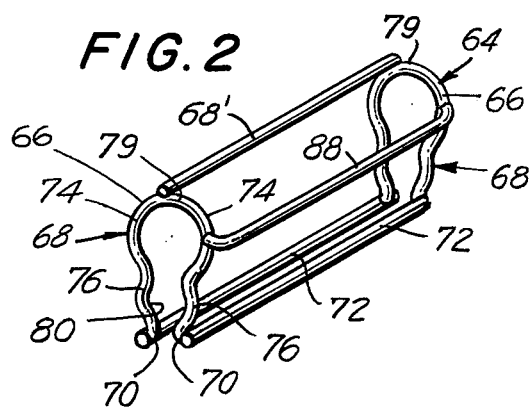
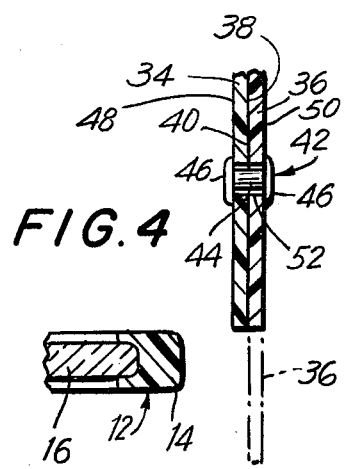
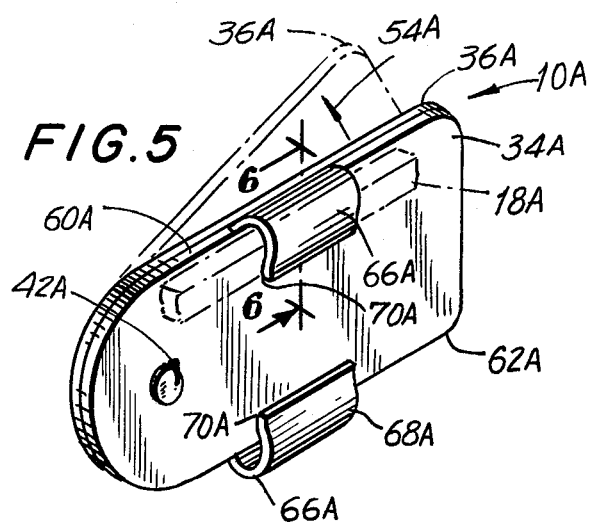
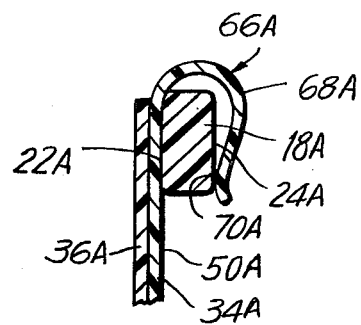

SIDE GLARE-ELIMINATING DEVICE FOR SECUREMENT TO EYEGLASSES AND OTHER SUITABLE MOUNTING STRUCTURES

BACKGROUND OF THE INVENTION

1. Field of the Invention

The present invention relates to an adjustable glare-eliminating structure or device which may be positioned upon a temple-bar of conventional eyeglass frames and similar mounting structures. More particularly, the invention relates to an improved non-glare shield for attachment to a temple-bar of eyeglass frames which may be economically manufactured while being capable of performing satisfactory service and adjusted to vary the amount of light permitted to pass therethrough.

2. Description of the Prior Art

Shields and visors of various types designed to be used in conjunction with ordinary eyeglass frames have long been known and disclosed in the prior art. Some shields, such as that disclosed in U.S. Pat. Nos. 3,204,252 and 2,858,539 are useful to eliminate the unpleasant glare created by light rays directed at the side of the face, but fail to provide the user with the means to vary the amount of light transmission therethrough.

Most sunglasses fail to provide protection to the eyes from a light source located generally to the side of the user or wearer. It is therefore advantageous for a person who spends even occasional extended periods of time out-of-doors, especially a person who remains out-of-doors at a relatively fixed location, to be provided with an efficient shielding device to avoid the glare from a light source, such as the rising or setting sun, or an artificial light source. Without such a shielding device, one is likely left with the less satisfactory technique of shading the eyes with the hand or with an object held in the hand. Shields which block light rays directed at the side of the face may be particularly useful at out-of-doors events, such as baseball or football games. Farmers, gardeners, tourists, boating enthusiasts, fishermen, hunters, hikers, golfers, as well as sun bathers, etc., can use such a glare-eliminating structure to good advantage. Glare-shields may also be used under some circumstances indoors when protection to the eyes is desired from an artificial light source as well.

Since the intensity of the light will vary at outdoor and indoor locations, I have found that optimum beneficial results are obtainable with a device that provides the wearer with the ability to control the light intensity passing through the device.

OBJECTS OF THE INVENTION

An object of the present invention is to provide an improved glare-eliminating device which may be economically constructed while capable of performing satisfactory service and permitting the wearer to adjust the light transmission characteristics thereof to vary the intensity of light passing therethrough.

Another object of the present invention is to provide an improved gare-eliminating device which is capable of being securely attached to a temple-bar of a conventional eyeglass frame which may be of any one of a large variety of configurations.

Another object of the present invention is to provide an improved compact glare-eliminating structure of simple construction which is capable of being adjustably positioned upon a temple-bar of conventional eyeglass frames and of eliminating glare from a light source directed to the side of the face.

Another object of the present invention is to provide an improved compact glare-eliminating structure of simple construction which is capable of being adjustably positioned upon either temple-bar so that one device may be interchangeable for use with either the left or right temple-bar.

SUMMARY OF THE INVENTION

A side glare device for attachment to a temple-bar of eyeglass frames and the like mounting structures, having a first glare shield member and a second glare shield member with overlapping surfaces for adjustment relative to each other along a common plane to vary the amount of light transmital to the eyes of the wearer of the eyeglass frames, means for coupling of the first and second members with respect to one another to permit relative positionment of the second member with respect to the first member along the common plane is provided.

Means for permitting removable positional securement of the first member on the temple-bar for maintaining the device at the desired position along the temple-bar is also provided. In accordance with the embodiment of the invention, means for mounting the first and second members with respect to the coupling means for angular movement in a plane substantially normal to the length of the temple-bar is disclosed.

The glare shields, in the preferred embodiment hereof, are manufactured from polarized sheets of optical filter material which are mounted to selectively vary the intensity transmission through the combination of the first and second members which are polarized in different directions. Accordingly, the combination of two polarized sheets of material to provide varying blocking intensity permits the user to block the light source which impedes the vision of the wearer.

The glare eliminating device is ideally suited for use in driving of a vehicle. Firstly, by a wearer during daylight hours when the sunlight is disposed at the periphery of a wearer, and secondly, for utilization by a driver of a vehicle at night to prevent the light source of a vehicle behind the wearer, impinging upon the wearer's side view mirror and being reflected into the drivers eyes from distracting his vision.

BRIEF DESCRIPTION OF THE DRAWINGS

The foregoing and other objects, features, advantages and utilizations of the new and novel side glare-eliminating device of the present invention will become more apparent from the detailed description hereinafter considered in conjunction with the accompanying drawings, wherein:

FIG. 1 is a perspective view of a conventional pair of eyeglasses with the side glare-eliminating device of the present invention illustrated as attached to each temple bar;

FIG. 2 is a perspective view of the clip assembly utilized with the embodiment of the invention illustrated in FIG. 1;

FIG. 3 is a sectional view taken along line 3—3 of FIG. 1;

FIG. 4 is a sectional view taken along line 4—4 of FIG. 1;

FIG. 5 is a perspective view of a glare-eliminating device illustrating another embodiment of the present invention; and FIG. 6 is a sectional view taken along 6—6 of FIG. 5.

DETAILED DESCRIPTION OF THE PREFERRED EMBODIMENTS

Referring now to the drawings, and more particularly to FIGS. 1 through 4 thereof, is shown a first embodiment of a side glare-eliminating device 10 for attachment to a pair of eyeglass frames 12 comprising a frame portion 14 including a pair of lenses 16 and having a pair of temple-bars 18 mounted by means of conventional hinge assemblies 20. Each temple-bar 18 may include an inner edge or surface 22, a spaced apart outer edge or surface 24 extending between a front end 26 and rear end 28. Each temple-bar 18 further includes an upper end 30 and lower end 32, as best illustrated in FIG. 3. The eyeglass frames 12 may take various shapes and configurations, all of which are adapted for use with the present invention.

The glare-eliminating device 10 comprises a pair of glare shield members, referred to herein as a first or inner glare shield member 34 and a second or outer glare shield member 36. The respective members 34 and 36 having overlapping surfaces 38 and 40, respectively, which are designed for adjustment relative to each other along a common plane. Each of the members 34 and 36 is manufactured from a light filtering material. By providing the two members 34 and 36 that may be adjusted relative to each other, the degree of light passing through the assembled members 34 and 36 may vary.

The members 34 and 36 may be manufactured from a variety of materials, well known in the art, to filter the light passing therethrough. The members 34 and 36 may be formed of a material having the same or differing degrees of light transmission. This permits a wearer of the glasses to readily adjust the amount of light passing therethrough.

Coupling means 42 is provided, and as illustrated in FIG. 4, may be comprised of a fastener 44 having a head 46 for engaging outer surfaces 48 and 50 of members 34 and 36, respectively, The fastener 44 extends transversely through the first and second members 34 and 36, as by an aperture 52 provided in each of said members 34 and 36, respectively. Accordingly, the coupling means 42 maintains the surfaces 40 and 38 in overlapping engaging relationship to each other. In this manner, the overlapping surfaces 38 and 40 are maintained in engagement such that an external force is required to shift the members 34 and 36 relative to each other.

As illustrated in FIG. 1 the inner member 34 may extend in fixed position relative to a temple-bar 18, and the outer member 36 angularly moved in the direction of arrow 54 to vary the amount of light passing through the inner member 34. Another aspect to the invention is that the surface area that is blocked or filtered, as to the transmission of light therethrough, may be enlarged when the device 10 is opened as in FIG. 1.

The shape and size of the first and second members 34 and 36 may vary and the overlapping surfaces 38 and 40 may be of a planar configuration. Each member 34 and 36 includes oppositely disposed ends, which may be referred to as the inner or front end 56 and outer or rear end 58. Disposed between the end 56 and 58 is an upper surface 60 and a lower surface 62. The upper surface 60 may extend in a substantially horizontal plane coinciding with the upper end 30 of each temple-bar 18. The coupling means 42 extends adjacent one of the ends 56 or 58. As illustrated in FIG. 1, the coupling means 42 extends adjacent the front end 56.

In the foregoing manner, the coupling means 42 permits relative positioning of the second member 36 with respect to the first member 34 along the common plane between the overlapping surfaces 38 and 40. Securement means 64 is provided, and particularly illustrated in FIGS. 2 and 3, for permitting removeable, positionable attachment of the first member 34 to the temple-bar 18 for maintaining the device 10 at the desired position along the temple-bar between the respective front end 26 and rear end 28. The securement means 64 comprises a pair of longitudinally aligned spaced apart resilient clips 66 having an inner edge for releasably engaging opposing surfaces 22 and 24 of either temple bar 18. To maintain the clips 66 in spaced relationship to each other, the connecting member 68' is provided therebetween.

Each of said clips includes a pair of spaced apart resilient arms 68 having a front end 70, at which the respective arms 68 may be joined together. Each clip 66 may be integrally formed such that the spacing between each of the front ends 70 of a respective pair of cooperating arms 68 is less than the width of the temple-bar 18 between the spaced apart surfaces 22 and 24. In this manner a manually applied force is required for both engagement with and disengagement from a temple-bar 18. A front element 72 is utilized for connecting the respective front ends 70 of adjacent clips 66. The front elements 72 aid in initially spreading the front ends 70 of the clips 66.

Each arm 68 is formed having an upper section 74 and a lower section 76, with a junction inner edge 78 therebetween. The lower section 76 terminates at the front end 70, and the upper section terminating at a rear end 79. The rear end 79 may extend adjacent the connecting member 68. The lateral spacing at the junction inner edge 78 is of a width less than the thickness defined by the surfaces 22 and 24 of a temple-bar 18. In this manner frictional engagement is maintained in the assembled position illustrated in FIG. 3. The lower section 76 may include an outwardly extending inclined section of segment 80 which is adapted for engaging the spaced apart bottom ends or corners of the temple-bar 18 when the device 10 is attached thereto.

Mounting means 82 is provided in order to be able to angularly rotate the members 34 and 36 in the direction of the arrow 84 illustrated in FIG. 3. The angular movement illustrated by arrow 84 is in a plane substantially normal to the length of the temple-bar 18. The mounting means 82 may comprise a hinge element 86 secured to the upper surface 60 of the inner member 34. A hinge pin 88 extends through the hinge element 86. The hinge pin 88 may be mounted between the spaced apart pair of clips 66. In this manner the members 34 and 36 may be simply rotated when they are no longer desired to be in position, or perhaps the angle of the rays of the sun have changed.

The hinge element 86 and hinge pin 88 are provided with the necessary interference fit in order to permit the members 34 and 36 to be angularly rotated with respect to the hinge pin 88 by a selected amount. The hinge pin 88 is dimensioned to receive thereon the hinge element 86 which may be of a clip on design and still function to be disposed in angular rotation in the direction of arrow 84 of the members 34 and 36.

Accordingly, the coupling means 42 permits the selected angular orientation of one of the members or sheets 36 with respect to the other of the members or sheets 34 to block the sun which impedes the vision of the wearer in dependence upon the peripheral angular path of the sunlight, or light reflection, with respect to the wearer. Each member 34 and 36 may be of polarized material and polarized in different directions. This permits the range of light to be selectively varied, from almost total darkness when both of the members are in overlapping most total darkness when both of the members are in overlapping relationship to each other, to a greater amount of light transmission when the members are minimally overlapped and there is minimal polarization.

The utilization of the shields or members 34 and 36, in overlapping and thereby fully polarized position, would prevent the light transmission toward the wearer from being reflected directly into his or her line of sight.

Accordingly, it is to be appreciated that the outer glare shield member 36 may also be disposed as illustrated in phantom in FIG. 1 to extend forwardly beyond the front plane of the lenses 16. In addition, although the device 10 is shown as worn on the left temple-bar, the device 10 may also be worn on the right temple-bar. It therefore will be apparent that the device 10 can be worn on either of the temple bars with equal efficacy due to the complete pivotal rotation of said device which is possible due to the hinge 86. In this manner, the device 10 is completely interchangeable and may be worn in the down position, shown in FIG. 1, with regard to the left temple-bar or in the up position, shown with regard to the right temple-bar. However, the device 10 may also have the pictorial representation, as shown in FIG. 1, changed; wherefore, the device may be used in the upwardly extending position with regard to the left temple-bar and in the down position in conjuction with the right temple-bar.

With reference to FIGS. 5 and 6, there is illustrated a second embodiment of the present invention depicting a side glare-eliminating device 10A, and, wherein similar parts are denoted by similar reference numerals. In accordance with this embodiment of the invention, the assembled glare shield members 34A and 36A are maintained relative to each other by coupling means 42A. This embodiment of the invention permits a pair of members 34A and 36A to be useable or interchangeable with either temple-bar 18A.

To accomplish this purpose, a pair of resilient clips 66A may be integrally formed with member 34A. Each clip 66A includes a front end 70A extending at the bottom of arm 68A. The spacing between the surface 50A and the front end 70A is designed so as to snap over surfaces 22A and 24A of temple-bar 18A.

By providing the spaced apart clips 66A from the surfaces 60A and 62A a single assembly of members 34A and 36A may be utilized on either temple-bar 18A. As explained previously, the outer member 36A is still free to rotate in the direction of arrow 54A to accomplish the same end result as obtained with respect to the embodiments illustrated in FIGS. 1 through 4.

It will be apparent to those skilled in the art that the term "sunlight" or "light source" is intended to means any bright rays which are desired to be kept away from the wearer of the side glare device of the present invention. Similarly, it will be apparent that in its completely unfolded position, the side glare device protrudes forwardly or beyond the plane of the eyeglasses of the wearer and can prevent light, other than lateral peripheral light, from impinging upon the eyes of the wearer, and thereby avoid annoyance to the wearer.

In the event a wearer does not wear eyeglasses, another mounting support for the side glare device of the present invention may comprise a hat, cap or similarly suited mounting structure.

While I have shown and described the various embodiments of the present invention, and due to the detailed disclosure of said embodiments, it will be obvious and readily apparent to those skilled in the art that there are many modifications, changes and improvements which may be made in the present invention, as herein envisioned, without departing from the spirit and scope of the invention, as herein disclosed.

What is claimed is:

1. A side glare device for attachment to a selected temple-bar of eyeglass frames or other suitable mounting means, said device comprising a first glare shield member and a second glare shield member, said first and second members being provided with overlapping surfaces for adjustment relative to each other along a common plane to selectively vary the amount of light transmission towards the eyes of the wearer of said side glare device, means for coupling said first and second members with respect to one another to permit relative positioning of said second member with respect to said first member along said common plane, said coupling means being operable to permit movement of said second member with respect to said first member between a first relative superimposed coextensive orientation and a second relative non-superimposed and non-coextensive orientation and to a multiplicity of substantially non-superimposed and non-coextensive orientations between said first and second orientations, and means for permitting removable positional securement of said first member on said temple-bar for maintaining said device at the desired position along said temple-bar.

2. A side glare device in accordance with claim 1, wherein said overlapping surfaces of said first member and said second member are maintained in engagement with each other by said coupling means, and an external force is required to shift said members relative to each other.

3. A side glare device in accordance with claim 1, wherein said coupling means includes a fastener extending transversely through end portions of each of said first and second members for maintaining said surfaces in said first overlapping superimposed relationship with one another, said fastener having an axis, and each of said first and second members being pivotally movable with respect to the other of said members about the axis of said fastener.

4. A side glare device in accordance with claim 1, wherein said first and second members are each provided with a planar surface, and said planar surface comprises said overlapping surfaces.

5. A side glare device in accordance with claim 1, wherein said first member and said second member have oppositely disposed ends and upper and lower surfaces intermediate said ends.

6. A side glare device in accordance with claim 5, wherein
said coupling means extends adjacent one of said ends of said first member and said second member.

7. A side glare device in accordance with claim 1, wherein
each of said first and second members is fabricated from a material having preselected light transmission characteristics.

8. A side glare device in accordance with claim 7, wherein
said first and second members are formed from materials having different preselected light transmission characteristics.

9. A side glare device in accordance with claim 7, wherein
said first and second members are formed from a material having substantially the same preselected light transmission characteristics.

10. A side glare device in accordance with claim 1, including
means for mounting said first and second members with respect to said coupling means for angular movement in a plane substantially normal to the length of said temple-bar.

11. A side glare device in accordance with claim 10, wherein
said mounting means comprises a hinge element and a hinge pin extending through said hinge element.

12. A side glare device in accordance with claim 11, wherein
said hinge element is secured to said first member, and
said hinge pin is secured to said securement means.

13. A side glare device in accordance with claim 1, wherein
said securement means comprises a pair of longitudinally aligned and spaced apart resilient clips having an inner edge for releasably engaging opposing surfaces of said temple-bar.

14. A side glare device in accordance with claim 13, further including
a connecting member maintaining said clips in said spaced apart longitudinally aligned relationship.

15. A side glare device in accordance with claim 13, wherein
each of said clips includes a pair of spaced arms, each of said arms having a front end,
said spacing between each of said front ends of each pair of said arms being less than the width of said temple-bar to require a manually applied force against said securement means for engagement with and disengagement from said temple-bar.

16. A side glare device in accordance with claim 15, further including
a front element connecting a respective one of said front ends of each of said clips together.

17. A side glare device in accordance with claim 15, said arms each being formed having an upper section and a lower section with a junction therebetween, said upper section terminating in a rear end, and said lower section terminating in said front end.

18. A side glare device in accordance with claim 17, said spacing between said junction in a corresponding pair of said arms being spaced from each other a width less than the thickness of said temple-bar.

19. A side glare device in accordance with claim 18, said lower section of each of said arms includes an outwardly extending inclined section, said inclined sections of a corresponding pair of arms engaging the spaced apart bottom end surfaces of said temple-bar when said device is secured to said temple-bar.

20. A side glare device in accordance with claim 1, wherein
said securement means is integrally formed with said first member.

21. A side glare device in accordance with claim 20, wherein
said securement means includes a pair of spaced apart resilient clips, and
said clips extending from an upper and lower spaced apart surface of said first member for use on either of said temple-bars of said eyeglass frames.

22. A side glare device in accordance with claim 1, wherein
each of said first and second members are fabricated from a polarized material.

23. A side glare device in accordance with claim 22, wherein
each of said first and second members are polarized in different directions.

24. A side glare device for attachment to a selected temple-bar of eyeglass frames and similar mounting means,
said device comprising a first glare shield member and a second glare shield member, said first and second members being provided with overlapping surfaces for adjustment relative to each other along a common plane to vary the amount of light transmission towards the eyes of the wearer of said side glare device.
means for couping of said first and second members with respect to one another to permit relative positionment of said second member with respect to said first member along said common plane,
said coupling means includes a fastener extending transversely through end portions of each of said first and second members for maintaining said surfaces in overlapping relationship with each other,
said coupling means being operable to permit movement of said second member with respect to said first member between a first relative superimposed coextensive orientation and a second relative non-superimposed and non-coextensive orientation and to a multiplicity of substantially non-superimposed and non-coextensive orientations between said first and second orientations,
means for permitting removable positional securement of said first member on said selected temple-bar for maintaining said device at the desired position along said temple-bar, and
means for mounting said first and second members with respect to said coupling means for angular movement in a plane substantially normal to the length of said temple-bar.

25. A side glare device in accordance with claim 24, wherein
said overlapping surfaces of said first member and said second member are maintained in engagement with each other by said coupling means and an external force is required to shift said members relative to each other.

26. A side glare device in accordance with claim 24, wherein
said first and second members are each provided with a planar surface,
said planar surface comprising said overlapping surfaces,
said first member and said second member having oppositely disposed ends and upper and lower surfaces intermediate said ends, and
said coupling means extending adjacent one of said ends of said first and second members.

27. A side glare device in accordance with claim 24, wherein
each of said first and second members is fabricated from a material having preselected light transmission characteristics.

28. A side glare device in accordance with claim 24, wherein
said mounting means comprises a hinge element and a hinge pin extending through said hinge element,
said hinge element is secured to said first member, and
said hinge pin is secured to said securement means.

29. A side glare device in accordance with claim 24, wherein
said securement means comprises a pair of longitudinally aligned spaced apart resilient clips having an inner edge for releasably engaging opposing surfaces of said temple-bar, and
a connecting member maintaining said clips in said spaced apart longitudinally aligned relationship.

30. A side glare device in accordance with claim 29, wherein
said clips include a pair of spaced apart arms, each of said arms having a front end,
said spacing between each of said front ends of each pair of said arms being less than the width of said temple-bar to require a manually applied force against said securement means for engagement with and disengagement from said temple-bar.

31. A side glare device in accordance with claim 30, further including
a front element connecting a respective one of said front ends of each of said clips together,
said arms each being formed having an upper section and a lower section with a junction therebetween,
said upper section terminating in a rear end,
said lower section terminating in said front end,
said spacing between said junction in a corresponding pair of said arms being spaced from each other a width less than the thickness of said temple-bar,
said lower section of each said arm includes an outwardly extending inclined section, and
said inclined sections of a corresponding pair of arms engaging the spaced apart bottom end surfaces of said temple-bar when said device is secured to said temple-bar.

32. A side glare device in accordance with claim 24, wherein
said securement means is integrally formed with said first member,
said securement means including a pair of spaced apart resilient clips, and
said clips extending from an upper and lower spaced apart surface of said first member for use on either of said temple-bars of said eyeglass frames.

33. A side glare device in accordance with claim 24, wherein
each of said first and second members are fabricated from a polarized material.

34. A side glare device in accordance with claim 33, wherein
each of said first and second members are polarized in different directions.

35. A side glare device in accordance with claim 24, wherein
said first and second members are fabricated from a material to provide varying light blocking intensity.

36. A side glare device in accordance with claim 33, wherein
said first and second members are disposed in substantially overlapping and substantially conformed relationship, thereby providing full polarization.

37. A side glare device in accordance with claim 24, wherein
said securement means is adapted to be removably secured for use on either of said temple-bars of said eyeglass frames.

* * * * *